(No Model.)
E. M. HEWETT.
POROUS CUP FOR GALVANIC BATTERIES.
No. 390,597. Patented Oct. 2, 1888.
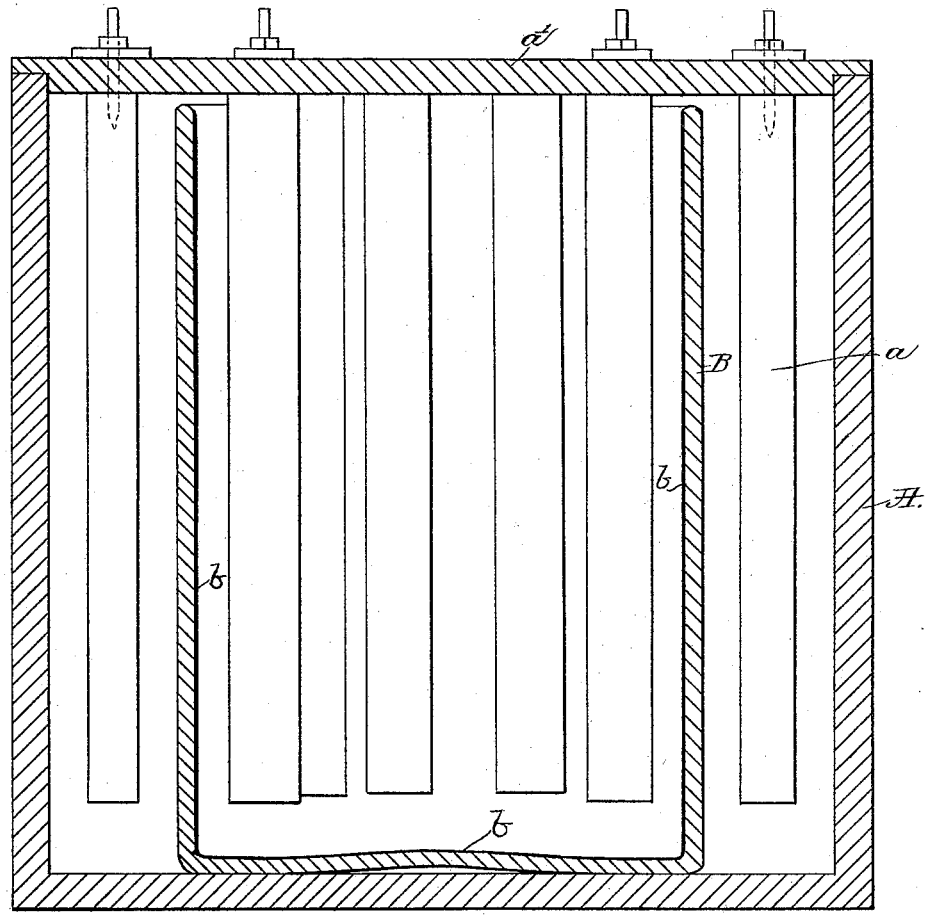

UNITED STATES PATENT OFFICE.

ERNEST M. HEWETT, OF NEWTON, ASSIGNOR, BY DIRECT AND MESNE ASSIGNMENTS, TO JAMES L. LITTLE, JR., OF BROOKLINE, MASSACHUSETTS.

POROUS CUP FOR GALVANIC BATTERIES.

SPECIFICATION forming part of Letters Patent No. 390,597, dated October 2, 1888.

Application filed April 30, 1888. Serial No. 272,346. (No model.)

*To all whom it may concern:*

Be it known that I, ERNEST M. HEWETT, of Newton, county of Middlesex, and State of Massachusetts, have invented an Improvement in Batteries, of which the following description, in connection with the accompanying drawing, is a specification, like letters on the drawing representing like parts.

This invention has for its object to improve the construction of electric batteries; and it consists in a porous cup for a battery sized interiorly or exteriorly, or both, with a coating of gelatinous material rendered insoluble by the application of chrome-alum or chromic acid, as will be hereinafter described.

The figure shows in vertical section a battery embodying this invention.

The outer containing jar or vessel, A, is of any usual size and shape. A porous cup, B, is placed in the jar A. The porous cup is sized interiorly and exteriorly with gelatine or gelatinous material, (indicated by the shaded line $b$,) and thereafter the said gelatine is rendered insoluble by the application or treatment with chrome-alum or chromic acid, or any of the oxides of chromium, said chemicals being applied with a brush, or otherwise, as desired. The zinc electrodes are made as several independent bars, $a$, preferably cylindrical, and attached to a plate, $a'$. Sometimes I would employ as many as twelve to twenty of these "bars" or "pencils," as they may be called. The bars are arranged in a circle, and occupy a position between the wall of the jar A and the cup B. The carbon electrodes are made as several independent bars, also preferably cylindrical, said bars being attached to or held in position by the plate $a'$. The carbon "bars" or "pencils," as they may be called, are placed within the porous cup B. As a solution for the jar A, I preferably use sal-ammoniac or sal-soda or common salt. As a solution for the porous cup B, any chromic salt or any chemical which liberates oxide of chromium in acid solution or sulphuric acid, or, in fact, any of the acids, may be used. By coating the porous cup with gelatinous material, which is thereafter rendered insoluble, the internal resistance is greatly diminished.

I claim—

In a battery, the porous cup sized interiorly or exteriorly, or both, with a coating of gelatinous material rendered insoluble by the application of chrome-alum or chromic acid, substantially as described.

In testimony whereof I have signed my name to this specification in the presence of two subscribing witnesses.

ERNEST M. HEWETT.

Witnesses:
JAS. H. CHURCHILL,
C. M. CONE.